United States Patent
DiMambro

(10) Patent No.: US 8,848,713 B2
(45) Date of Patent: Sep. 30, 2014

(54) DATA ROUTING ACCELERATION

(75) Inventor: Francesco DiMambro, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 915 days.

(21) Appl. No.: 12/578,181

(22) Filed: Oct. 13, 2009

(65) Prior Publication Data

US 2011/0085549 A1   Apr. 14, 2011

(51) Int. Cl.
*H04L 12/56* (2006.01)
*H04L 29/08* (2006.01)
*H04L 29/06* (2006.01)
*H04L 12/861* (2013.01)

(52) U.S. Cl.
CPC .............. *H04L 69/16* (2013.01); *H04L 69/32* (2013.01); *H04L 69/161* (2013.01); *H04L 49/9094* (2013.01)
USPC ............................ 370/392; 370/469; 370/474

(58) Field of Classification Search
None
See application file for complete search history.

(56) References Cited

U.S. PATENT DOCUMENTS

| | | | |
|---|---|---|---|
| 5,931,961 A * | 8/1999 | Ranganathan et al. | 714/712 |
| 6,728,349 B2 | 4/2004 | Chang et al. | |
| 6,842,622 B2 | 1/2005 | Peters et al. | |
| 7,190,351 B1 | 3/2007 | Goren | |
| 7,233,229 B2 | 6/2007 | Stroupe et al. | |
| 7,289,521 B2 * | 10/2007 | Herle et al. | 370/401 |
| 7,315,614 B2 | 1/2008 | Bedingfield, Jr. et al. | |
| 7,362,854 B2 | 4/2008 | McKnight | |
| 7,630,724 B2 | 12/2009 | Beyer, Jr. et al. | |
| 7,864,806 B2 * | 1/2011 | Qiu et al. | 370/474 |
| 2001/0029194 A1 | 10/2001 | Ketola et al. | |
| 2006/0229107 A1 | 10/2006 | Cho et al. | |
| 2008/0039152 A1 | 2/2008 | Arisawa | |
| 2008/0130561 A1 * | 6/2008 | Shao et al. | 370/329 |
| 2008/0317065 A1 * | 12/2008 | Chen et al. | 370/469 |
| 2009/0028179 A1 | 1/2009 | Albal | |
| 2009/0049175 A1 * | 2/2009 | Finn | 709/226 |
| 2010/0203904 A1 | 8/2010 | Khokhlov | |
| 2011/0076989 A1 | 3/2011 | Lynch | |
| 2011/0310892 A1 | 12/2011 | DiMambro | |

FOREIGN PATENT DOCUMENTS

| | | |
|---|---|---|
| EP | 1071295 | 1/2001 |
| EP | 2148531 | 1/2010 |

OTHER PUBLICATIONS

Otimizing TCP receive performance, Menon et al, 2008.*
Evans, Joel, "Review of Samsung Instinct," geek.com, 23 pages, Jul. 8, 2008.

* cited by examiner

*Primary Examiner* — John Blanton
*Assistant Examiner* — Tito Pham
(74) *Attorney, Agent, or Firm* — Park, Vaughan, Fleming & Dowler LLP

(57) ABSTRACT

Systems, devices and methods for improving network performance are disclosed. In particular, in one embodiment, a method of processing data packets in an electronic network is provided. The method includes receiving data packets at a receive stack of an electronic network device and creating a first packet from at least a portion of each of the set of data packets. The first packet includes an indicator that the first packet is a first packet type. Additionally, the method includes passing the first packet to one of a bridge and IP layer of the receive stack. A first packet inhibitor at the one of the bridge and IP layer is bypassed upon recognizing the first packet as a first packet type. The first packet is routed to a transmit stack of the electronic network device from the one of the bridge and IP layer.

18 Claims, 6 Drawing Sheets

DATA ROUTING ACCELERATION

TECHNICAL FIELD

The present application relates generally to computer networks, and more particularly to improving computer network performance.

BACKGROUND

In simple terms, computer networks facilitate the sharing of data between computing devices. Sharing data may include passing data through multiple network devices and or multiple networks. Typically, such devices may receive data at a first interface and route or forward the data to a second interface that transmits the data onward through the network. At each interface, information associated with the data is processed so that the data is properly handled and eventually reaches its destination. This processing, unfortunately, may add latency to data sharing and consumes processing power. Generally, the latency at a particular interface may not be particularly noteworthy; however, in the aggregate, this latency may be significant. Additionally, the latency issue may be exacerbated when relatively large amounts of data are shared or transmitted. This may be due to size limitations imposed on certain transmissions and/or by particular devices, for example.

Various techniques have been implemented to reduce the latency of data transmission through networks. Despite success in reducing latency with certain techniques, there remains opportunity for improvement.

SUMMARY

Aspects of the present disclosure include systems, devices and methods for improving network performance. In particular, in one embodiment, a method of processing data packets in an electronic network is provided. The method includes receiving data packets at a receive stack of an electronic network device and creating a first packet from at least a portion of each of the set of data packets. The first packet includes an indicator that the first packet is a first packet type. Additionally, the method includes passing the first packet to one of a bridge and IP layer of the receive stack. A first packet inhibitor at the one of the bridge and IP layer is bypassed upon recognizing the first packet as a first packet type. The first packet is routed to a transmit stack of the electronic network device from the one of the bridge and IP layer.

Another aspect includes an electronic network device that includes a processor and a memory coupled to the processor. The memory stores operating instructions for the operation of the network device. Additionally, the electronic network device includes a transmit stack and a receive stack operated by the processor. Each of the transmit stack and receive stack includes a first layer having a driver and a bridge layer. The bridge layer is logically adjacent to the driver and includes a first address table. The network device also includes a second layer logically adjacent to the bridge layer and operated by the processor. The second layer includes a second address table. The driver of the receive stack is configured to create a first packet of a first packet type from a plurality of received data packets. The first packet includes an indication for overriding packet size limits. Also, the bridge layer of the receive stack is configured to recognize the indication for overriding packet size limits and forward the first packet to a bridge layer of the transmit stack upon finding a common address in the respective first address tables of the receive stack and the transmit stack.

Yet another aspect includes a method for operating a network device. The method includes receiving data packets at a receive stack and generating a first packet of a first packet type from the received data packets. A packet map corresponding to a segmentation of the first packet is created and provided to a transmit stack. The packet map is used to segment the first packet into a plurality of outbound data packets. The method includes transmitting the plurality of outbound data packets.

DRAWINGS

DETAILED DESCRIPTION

Figure 1:
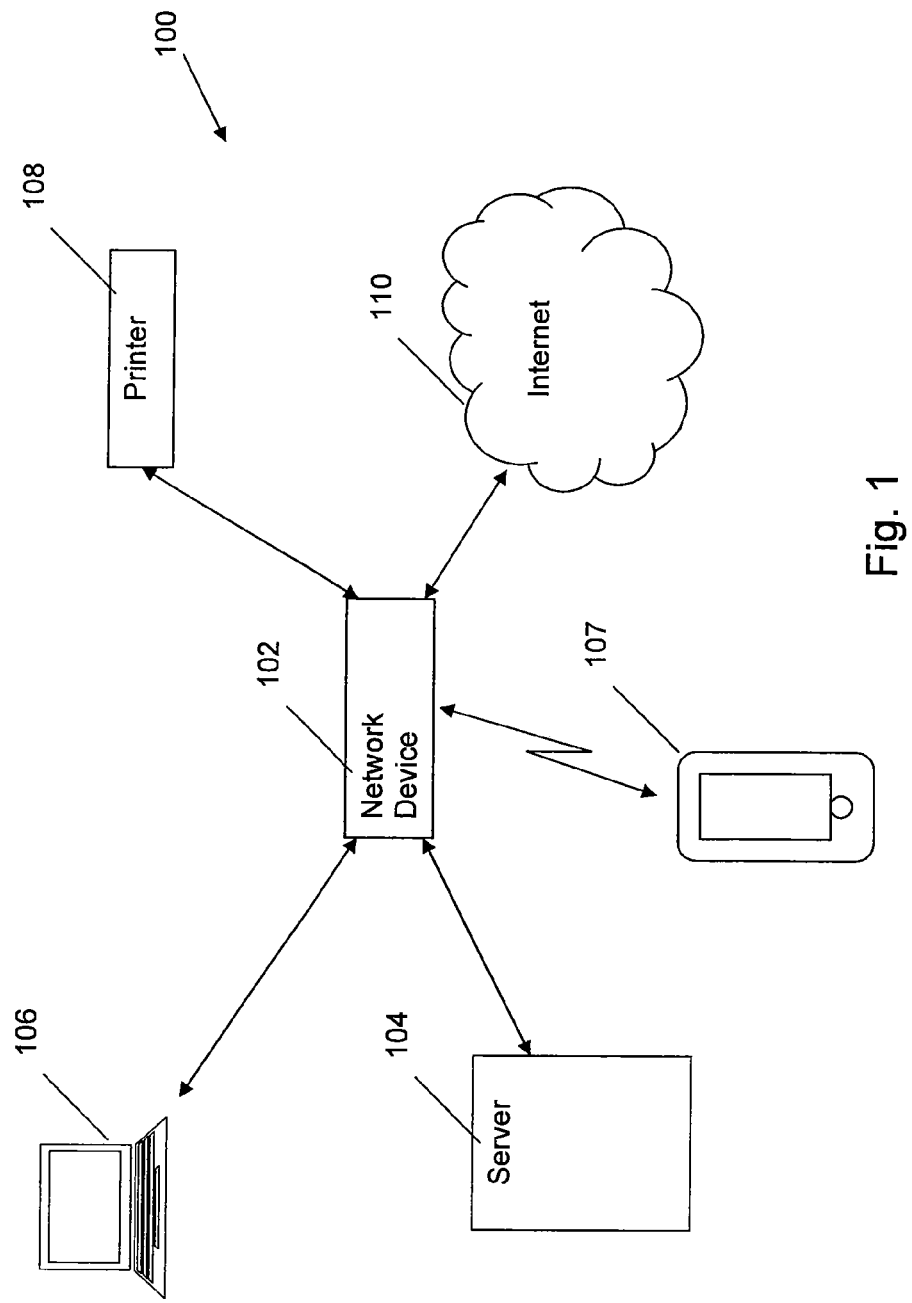
FIG. 1 illustrates an example electronic communications network and associated devices.

Generally, one embodiment includes systems and methods for expediting the routing of data packets through a network device. The method includes removing checks such as size checks, for example, from the processing path of data packets to allow packets to be transmitted at lower layers of a software stack. Upon removal of the checks, the data packets may then be forwarded from a receive stack to a transmit stack via a bridge layer or a network layer. Once in the transmit stack, the data packets may be classified as a packet recognizable in the transmit stack to be processed as a whole in a firmware layer. The classification the data packet may include setting a bit in a header indicating the data packet as a recognized classification. Upon being recognized in the transmit stack, the data packets are directed to a driver in the transmit stack for segmentation and generation of checksums to facilitate transmission of the data packets.

In one embodiment, the method relates to receiving large receive offset (LRO) packets and removing size checks in bridge and Internet Protocol (IP) layers to allow forwarding of the LRO packet at the bridge or IP layers to the transmit stack, bypassing an applications layer. To remove the size checks, a header in the LRO packets may be modified. Additionally, the bridge and IP layers may be modified such that they recognize the LRO packet and do not reject the LRO packet. Once in the transmit stack, the LRO packet may be classified as a transmit segmentation offload packet (TSO) and forwarded to a driver in the transmit stack.

In order to facilitate the passing of the LRO packet from a receive stack to a transmit stack, current LRO implementations are enhanced to detect a maximum segment size (MSS). Accordingly, a packet size monitor is added in the present LRO implementation to allow for determination of the MSS. As packets are received and added to the LRO chain, the largest received packet size is used to set the MSS. The determined MSS is provided to the transmit stack and used by the TSO to segment the packets for transmission.

In conventional implementations, the MSS is provided in the TCP/IP three way connection handshake, but LRO is speculatively activated based on packet arrival rate after the three-way handshake has been completed, thus missing the opportunity to establish the MSS. Additionally, conventional LRO is not concerned with MSS because the LRO packets terminate at the receiving device. In contrast, the present disclosure allows for the LRO packets to be retransmitted using TSO.

In addition to the LRO data packets being passed to the transmission stack at the bridge or IP layer, packet maps created when the large receive offload data packets are received. Specifically, when the data packets from a single large communication are received and a LRO data packet is created, the data packets of the LRO data packet are mapped. As the LRO data packet is directly converted into a TSO data packet in the transmit stack, the maps created in conjunction with the LRO data packet may be used. Hence, the transmission stack does not need to generate packet maps. In one embodiment, the packet maps are receive packet (Rx Pkt) DMA maps. The Rx Pkt DMA maps can be reused on the transmission side, avoiding the current requirement of regenerating the map when the received packets that are to be forwarded arrive on the transmission stack.

In another embodiment, hardware in the transmission stack may not be configured to process TSO data packets. That is, the hardware may not be TSO compliant and, thus, unable to segment the packets. Hence, the bridge or IP layers in the transmit stack may be configured to perform segmentation of the TSO data packets, in addition to other functionality described herein.

Turning now to the drawings and referring initially to FIG. 1, an electronic communications system 100 is illustrated. The electronic communications system 100 includes a network device 102 that is communicatively coupled to various other devices of the system 100. As one non-limiting example, the network device 102 may be communicatively coupled to a notebook computing device 104, a server 106, a wireless computing device 107, a printer 108 and the Internet 110 (or any other network service). Each of the various devices of the system 100 include hardware and software to enable the devices to communicate data with other devices in the system 100 and various type of such devices are available commercially. The wireless computing device 107, for example, may be a wireless multi-media device, a smart phone, a tablet computing device, or any other wireless communication device.

The various devices of the system 100 may be communicatively coupled together via any available communication medium and various communications media may be used within the system 100. For example, the notebook computer 104 may be communicatively coupled to the network device 102 via a wired communication link (such as an Ethernet cable), while the server 106 may be coupled to the network device 102 via a fiber optic link and the printer 108 may be coupled to the network device 108 via a wireless communication link (e.g., WiFi).

The network device 102, can be any computing device that can connect to the network and process packets as described herein, typically with an inbound and outbound protocol stack. For example, in some embodiments, the network device 102 may be configured as a router for processing and routing data packets between devices of the system 100. In other embodiments, the network device 102 may be a computer, server, mobile computing device, etc.

Figure 2:
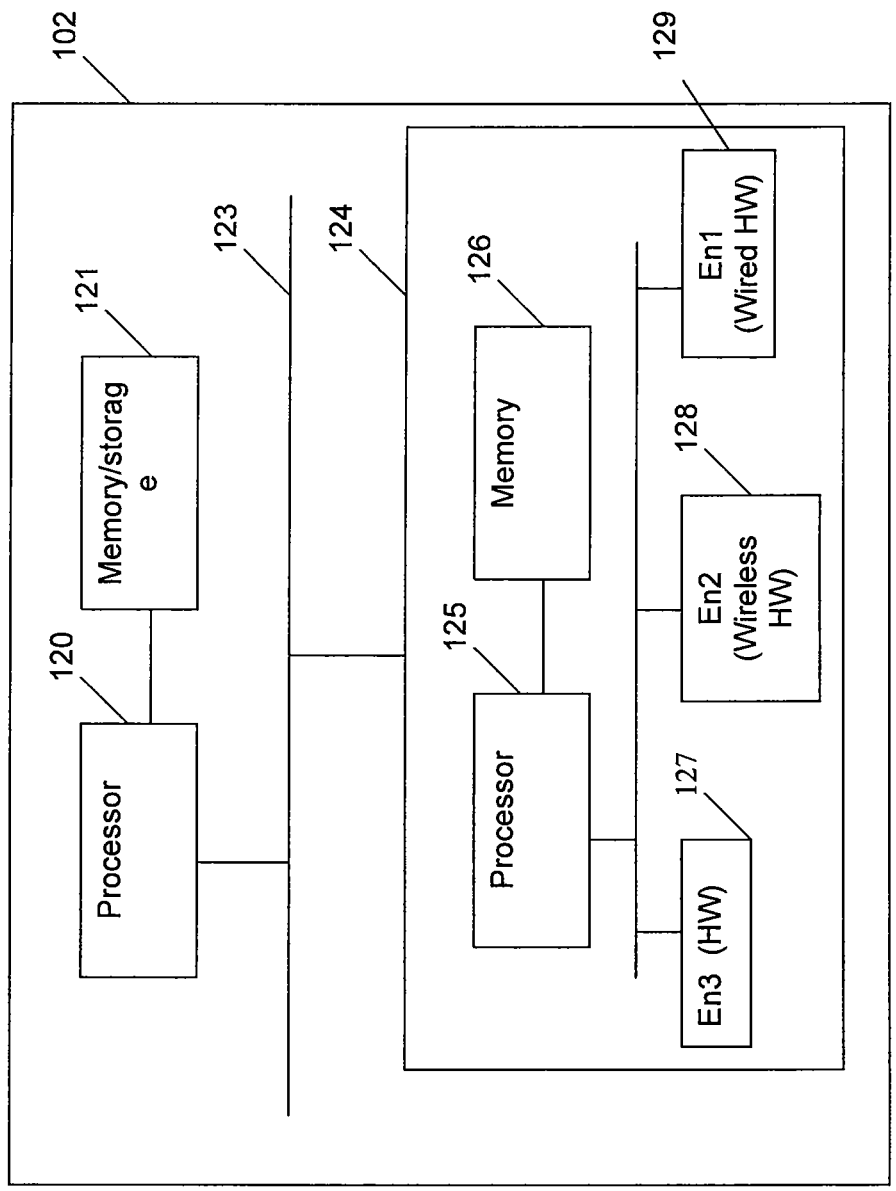
FIG. 2 is an example block diagram of a network device associated with the electronic communications network of FIG. 1.

A simplified block diagram of the network device 102 is illustrated in FIG. 2. The network device 102 includes a processor 120 and a memory 122. The processor 102 may be any suitable processor, such as a Core i7 series processor from Intel™, or an Phenom series processor from AMD™, for example. In some embodiments, the device 102 may include multiple processors and/or one or more multi-core processors. The memory 121 is coupled to the processor 120. The memory 122 may include one or more types of electronic memory including read only memory (ROM), electrically erasable programmable ROM, flash, random access memory (RAM), dynamic RAM, etc. Additionally, the memory 121 may include storage memory including hard disk drives, solid state drives, etc. The memory 122 includes instructions executable by the processor 120 for the operation of the network device 102.

The processor 120 may be coupled to a bus 123 that may be coupled to other electronic devices of the network device 102. In particular, the bus 123 may couple the processor 120 to a network card 124. It should be appreciated that one or more other devices may be coupled to the bus 123 and may be integrated into the network device 102. As such, the block diagram of FIG. 2 is not intended to include all component parts of the network device but, rather, is simplified for the purposes of this description.

The network card 124 includes component parts for facilitating network communications. Specifically, the network card 124 includes a dedicated processor 125 and a memory 126 for the receiving and transmitting data via communication ports 127, 128 and 129. The processor 125 may be any suitable processor for handling network communications.

The communication ports 127, 128 and 129 are coupled to the processor 125 and may be configured to support particular communication protocols. For example, communication ports 127, 128 and 129 may be configured to support Ethernet communications, fiber optic communications, or WiFi communications. In some embodiments, one or more communication ports may support a communication protocol that is different from a communications protocol supported by the other ports. Additionally, the communication ports 127, 128 and 129 are each configured to both transmit and receive data communications.

The memory 126 of the network card 124 may include one or more types of electronic memory including read only memory (ROM), electrically erasable programmable ROM, flash, random access memory (RAM), dynamic RAM, etc. The memory 126 includes instructions executable by the processor 125 for the receiving, processing and transmission of data packets. In some embodiments, the processor 125 and memory 126 may be part of an application specific integrated circuit (ASIC) or a system-on-chip (SOC). For example, Broadcom's BCM4712KFB SOC may be used. In other embodiments, the processor 125 and memory 126 may be discrete component parts of the network card 124.

The network card 124 and, more generally, the network device 102, is configured to receive, route and transmit data packets within the system 100. As such, the network device 102 includes one or more, software implemented receive stacks and one or more transmit stacks. Each of the receive and transmit stacks includes multiple layers. Each layer may include hardware, software or a combination of the two. Each layer may be dedicated to performing a distinct processing step for the processing of data packets. Generally, transmission of packets progresses downward through the stack while receipt of packets progresses upward through the stack.

Figure 3:
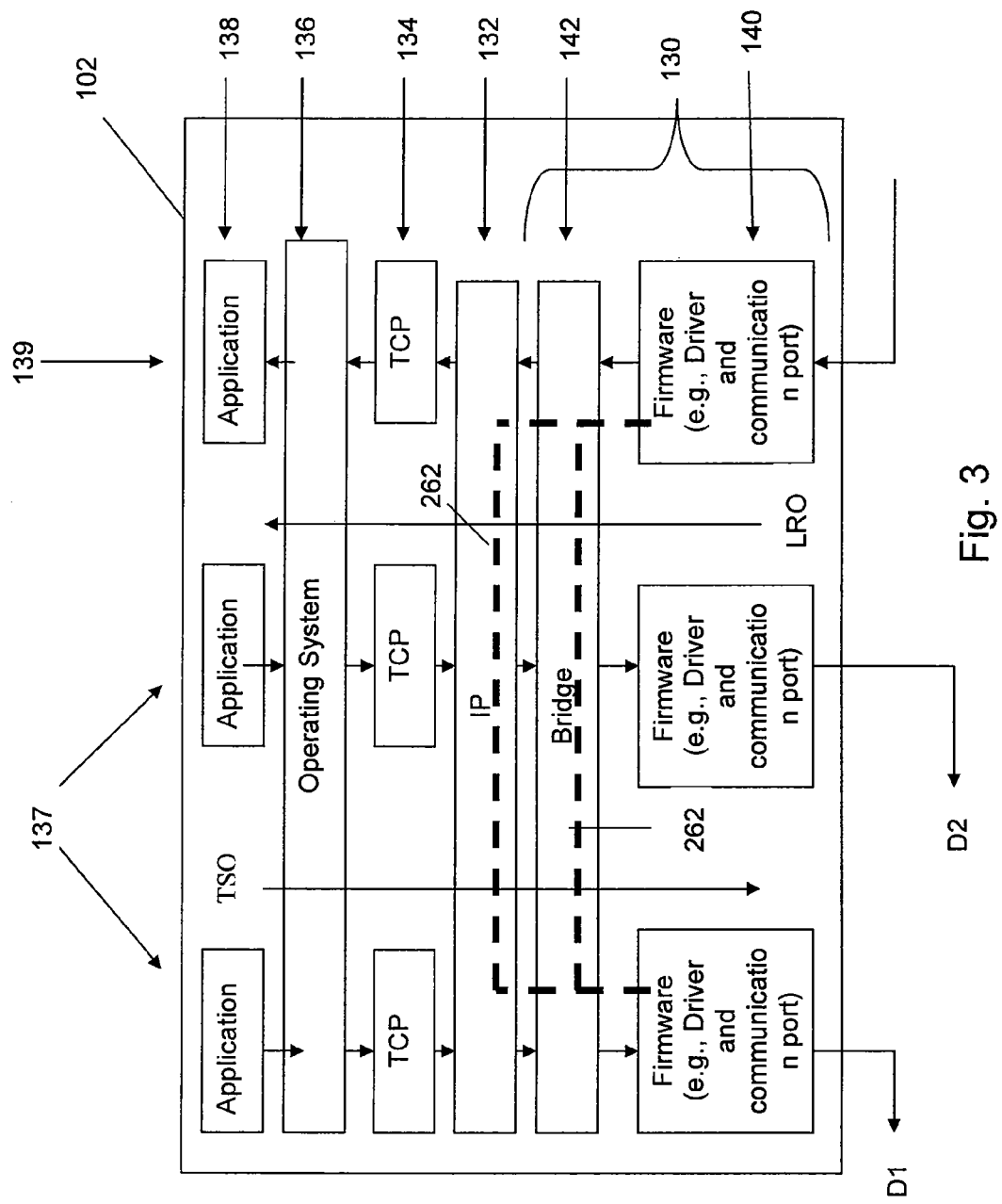
FIG. 3 illustrates software stacks for receipt and transmission of data by the network device of FIG. 2.

In one embodiment, as illustrated in FIG. 3, the network device 102 includes a data link layer 130, an internet protocol (IP) layer 132, a TCP layer 134, an operating system layer 136 and an applications layer 138. FIG. 3 illustrates two transmit stacks 137 and a receive stack 139. As can be seen, the transmit stacks 137 and the receive stack 139 include the same layers.

It should be appreciated, however, that other embodiments may include more or fewer layers and, further, that the function of the layers may not be delineated exactly in the manner set forth herein. As such, in some embodiments, a particular layer may be configured to perform tasks performed by an adjacent layer in other embodiments. Accordingly, the various illustrated layers and the following description are to be understood as merely exemplary and various other implementations may be conceived and implemented that may be considered equivalent thereto.

The data link layer 130 may include firmware 140, which includes hardware such as the communication ports 127, 128 and 129, and a driver for supporting the operation of the hardware in accordance with a particular communication protocol. The data link layer 130 also typically includes a bridge layer 142 that may be accessible to multiple transmit and receive stacks. The data link layer 130 generally may perform validation checks on received packets. Additionally, the data link layer 130 may perform segmentation and generate checksums for outgoing packets.

In some embodiments, the firmware 140 may support Ethernet communications under the IEEE 802.3 standard. In other embodiments, the firmware 140 may support other communication protocols such as wireless protocols (e.g., 802.11 a/b/g/n), fiber optic communication protocols, etc. Additionally, in some embodiments, the firmware 140 (i.e., the driver) may be configured to perform segmentation in accordance with the TSO protocol. If the driver is TSO capable, it may communicate its capability with other layers of the stack so that if the other layer of the stack receive a large packet, the packet may be labeled as a TSO packet and forwarded to the driver for segmentation. Additionally, although there are three firmware blocks illustrated, it should be appreciated that each may be configured to both transmit and receive data communications.

The bridge layer 142 may be configured to verify received frames and/or packets. Specifically, the bridge layer 142 may check a received frame's size, a checksum of the received frame, and an address for the frame, among other things. If the received packets are found to be valid, a header for the hardware layer may be removed and the packet is transmitted to the IP layer 132. Additionally, the bridge layer 142 may convert the packet from LRO to TSO and transmit the packet to the transmit stack, as discussed later in greater detail.

The IP layer 132 generally represents a network layer for performing routing functions. In some embodiments, the IP layer 132 may perform fragmentation of packets to a suitable size for transmission over the data link layer 130. Conversely, upon receiving fragmented packets, the IP layer 132 may be tasked with reassembly of the packets. The IP layer 132 also detects for discarding packets that contain errors. Additionally, the IP layer 132 may convert the packet from LRO to TSO and transmit the packet to the transmit stack, as discussed later in greater detail. While Internet Protocol (IP) is the most common protocol used, it should be appreciated that other protocols may be implemented to achieve the same or similar functionality.

The TCP layer 134 represents a transport layer for transparent transfer of data and controls the reliability of the data transfer services through error control and segmentation processes. It should be appreciated that in some embodiments, the TCP layer may implement protocols other than the Transmission Control Protocol (TCP), such as a User Datagram Protocol (UDP), for instance. In some embodiments, the TCP layer 134 may control the connections between computers and establish, manage and terminate communications between local and remote applications.

The operating system 136 may include any suitable operating system such as, for example, Apple's OSX™, Linux™, or Windows™. The operating system 136 generally controls the operation of the network device 102 and, more particularly, provides the interface for lowers layers of the stack, i.e, the link layer 130, the IP layer 132 and the TCP layer 134 with the higher layers, i.e., the applications layers 138.

The applications layer 138 handles network services such as name resolution, redirector services and file and printing. The name resolution involves converting IP address to names recognizable to a user. The redirector services, under conventional techniques, determines whether a user's request can be fulfilled locally or if it should be redirected to another computer. If the request needs to be forwarded to another computer, the request is processed through the TCP layer 134, the IP layer 132, the date link layer 130, and across the network to another computer that can fulfill the request. Accordingly, data typically originates and terminates at the applications layer 138. However, in accordance with the present disclosure, received data may bypass the applications layer 138 and be processed through the bridge layer 142 and/or the IP layer 132.

There are at least two existing technologies for servicing multiple packets in one up/down call to the respective transmit or receive stacks. Their design intent is for packets that are initiated by a host at the application layer 130. First, is the transmit segmentation offload (TSO). This technology offloads segmentation and checksum responsibilities to the firmware 140. The application layer 130 posts a large data buffer for transmission to the transmission stack which creates various headers for each layer and attaches the large chunk of data to the headers with an indication that the packet is a TSO packet. The indication allows the firmware 140 to recognize the packet as a TSO packet. Upon recognition of the TSO packet, the driver performs the segmentation and checksum before transmitting the packets over the transmission medium.

The second technology is large receive offload (LRO) which accumulates packets received from a single communication and reassembles the packets in the driver. The reassembled packets are aggregated with a single header. Specifically, the header of the first packet is saved and appended to the aggregated packets. The aggregated packets are then forwarded to the applications layer 138.

Conventional implementations of TSO and/or LRO require that the data always originate and terminate in the applications layer 138. More particularly, conventional implementations of LRO preclude the routing of LRO packets between transmission stacks. If an LRO packet is routed in a conventional LRO implementation, the connection often drops packets at a high rate resulting in poor network performance. The LRO packets are dropped because they fail stack consistency checks. As a result, performance is poor. Hence, altering the consistency checks to take account of LRO frames going to the transmit stack may increase the performance.

In certain embodiments herein, LRO packets may be routed without accessing the application layers 138 or the TCP layer 134. In particular the LRO packets may be routed through either the bridge layer 142 or the IP layer 132 without going to the applications layer 138, thus bypassing multiple processing steps. The bridge and IP layers are modified to recognize LRO packets and process the packets rather than discarding the packets. Additionally, the routed LRO packets may be converted to TSO packets in these layers of the receive and/or transmit stacks to further expedite processing of the packets.

Figure 4:
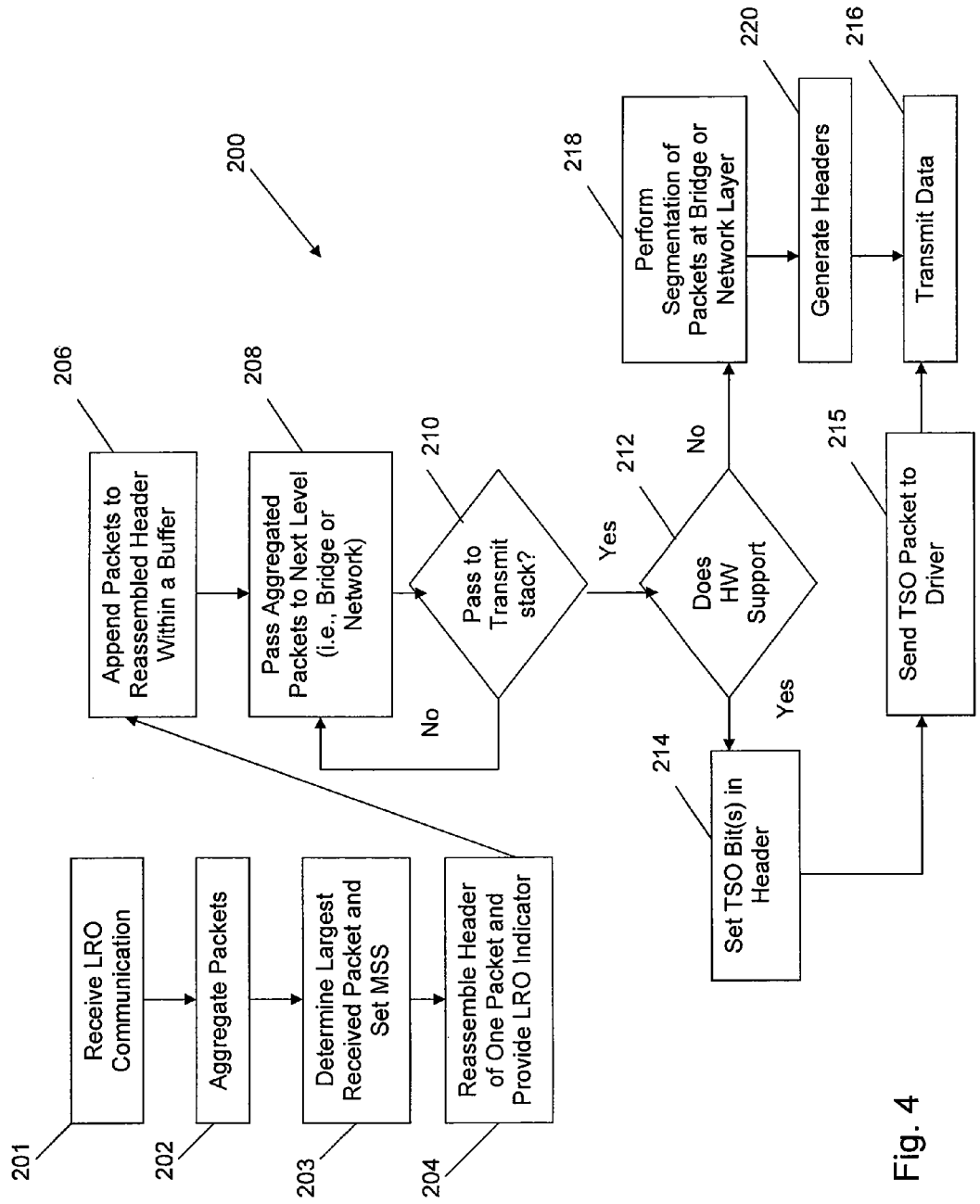
FIG. 4 is a flowchart illustrating a technique for providing large receive offset packets from a receive stack to a transmit stack bypassing an applications layer.

FIG. 4 is a flowchart 200 illustrating LRO routing. LRO routing is initiated by with the receipt of an LRO communication (Block 201), at a communication port, e.g., communication port 129. The packets of the LRO communication are aggregated to form an LRO message (Block 202). A header for the LRO packet is reassembled by the data link layer 130. In one embodiment, the reassembly may be performed by the driver. In an alternative embodiment, the bridge layer may perform the reassembly of the LRO packet header. Additionally, as the packets are received and aggregated, a packet size monitor monitors the size of the incoming packets. The largest received packet size is used to set the maximum size segment (MSS) if it exceeds the currently stored LRO MSS (Block 203).

The packets are appended to the header (Block 204). In appending the packets to the header, the packets may be placed in a buffer with the header. A map of the packet locations within the buffer is concurrently generated with the creation of the LRO packet. Specifically, the received packet DMA map is generated.

Figure 5:
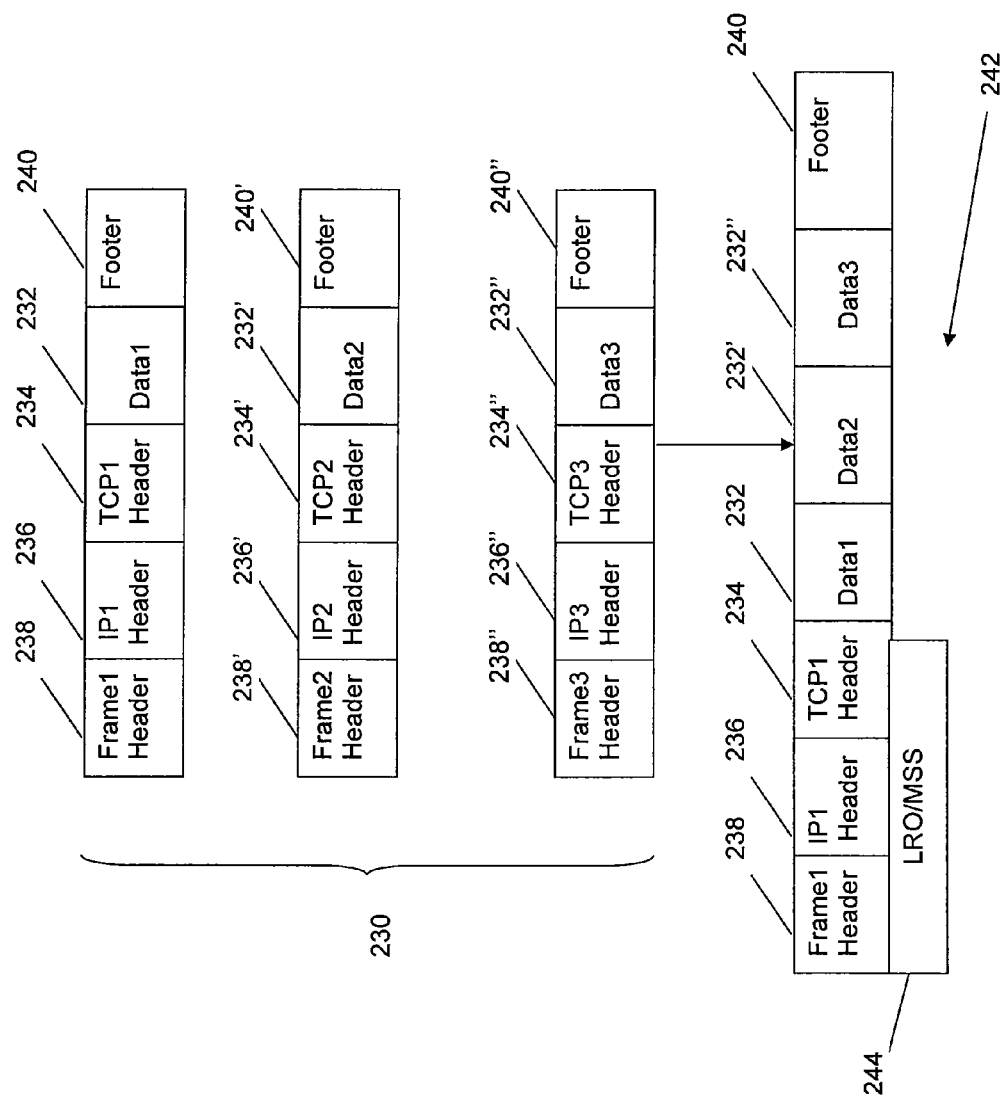
FIG. 5 illustrates creation of a large receive offload packet.

FIG. 5 illustrates creation of an example LRO packet. As shown, a set of frames 230 corresponding to a single communication is received. Each frame includes data 232. Additionally, each frame includes a TCP header 234, an IP header 236, a frame header 238 and a footer 240. The headers from one of the frames, e.g., the first frame, is saved while all the other headers are discarded. The data 232 of each of the frames is then appended to the saved header information to create the LRO packet 242. An indication 244 that the aggregated packet is a LRO packet is provided within the header. The indication 244 may include the setting of a particular bit or series of bits within the header. The creation of the LRO packet 242 may be performed by the driver or in the bridge layer 142.

Returning again to FIG. 4, once the LRO packet 242 is created it is passed up to the next level, e.g., the bridge layer 236 or the IP layer 132 (Block 208). Under conventional implementations of LRO capable devices, the bridge layer 142 and/or the IP layer 132 reject the LRO packet based on its large size. However, in the current embodiment, the indicator 244 acts as an override for the size limitations otherwise implemented by the bridge layer 142 or IP layer 132 and the LRO packet 242 is permitted to be processed by the bridge layer 142 and/or IP layer 132, rather than being discarded.

At the bridge layer 142 and/or IP layer 132, the device 102 determines whether to transmit the LRO packet 242 to the transmit stack (Block 210). Information contained in the headers of the LRO packet 242 may be used to make this decision. If the LRO packet 242 is not passed to the transmit stack at the bridge layer 142, the LRO packet 242 is passed up to the next level, e.g., IP Layer 132, where the same decision is made. Each of the bridge and IP layers 142 and 132 includes an address table that is used to determine if the packet is forwarded at that layer. Specifically, the bridge layer 142 includes a MAC address table and the IP layers 132 includes an IP address table. The tables are generated based on a determination as to which ports are communicating directly with each other. If, for example, the LRO message matches a MAC address in the table that the bridge knows as an outgoing port, then the routing happens in the bridge layer 142 using that MAC address. If not, the LRO message is passed to the IP layer 132 where an IP address is used, rather than a MAC address. For each LRO message, only a single table lookup is required at each layer for the entire group of packets included in the message.

If it is determined at the bridge or IP layers 142 and 132, respectively, that the LRO packet 242 should be passed to the transmit stack, the LRO packet 242 is passed in Block 208. Next a corresponding layer in the transmit stack determines if the firmware 140 of the transmit stack support TSO (Block 212). For example, if the LRO packet is transmitted at the IP layer 132 in the receive stack, the IP layer 132 in the transmit stack will determine if the firmware 140 of the transmit stack supports TSO. If the firmware 140 support TSO, the LRO packet 242 is flagged as a TSO packet. The flag may be accomplished by setting a bit or a series of bits in metadata of the headers to show that the packet is TSO compliant (Block 214). The TSO packet is then sent to the firmware 140 (Block 215) which will recognize the packet as a TSO packet and perform segmentation and checksums in preparation of the transmission of the packet. The LRO headers used in the receive stack are used as templates to create the headers in frames generated at the driver of the transmit stack. The frames, once generated, are then transmitted (Block 216).

Alternatively, if it is determined that the firmware of the transmit stack do not support TSO, the layer receiving the LRO packet, i.e., the IP layer 132 or the bridge layer 142 performs the segmentation of the data of the LRO packet 242 (Block 218). Headers are then generated at each level of the transmission stack (Block 220) and the firmware 140 encapsulates the data into a frame and transmits the data (Block 216), after which the process ends.

Referring back to FIG. 3, the movement of the LRO packet 242 through the layers of the device 102 is illustrated as the dashed lines 260 and 262. As can be seen, the LRO packet 242 never reaches the TCP layer 134 or the application layer 130. Rather, the LRO packet 242 is passed from the receive stack to the transmit stack at either the bridge layer 142 (line 260) or the IP layer 132 (line 262). Time savings are realized through the classification based on Layer 2 in the case of Bridge traffic or Classification based on layer 3 IP traffic. In both cases the classification is done once for many packets as opposed to individually on a per packet basis. Network address translation (NAT) at the IP layer 132 is accelerated by this also. Processing power is conserved as there are fewer processing steps involved in routing packets through the device 102.

Additionally, the use of TSO in the transmit stack (by converting the LRO packet 242 into a TSO packet) provides additional processing and time savings, as the segmentation of the packets is offloaded to the driver. Even in embodiments where the driver does not support TSO, the time savings achieved by routing the LRO packet 242 through the bridge layer 142 or IP layers 126 is significant enough to result in overall time savings relative to conventional techniques.

Figure 6:
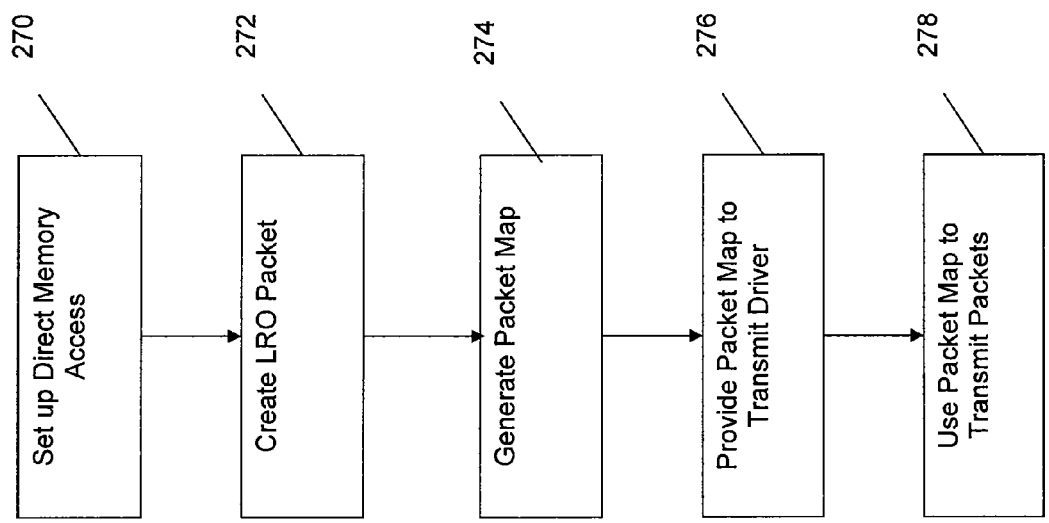
FIG. 6 is a flowchart illustrating sharing a packet map generated in conjunction with a large receive offload packet from a receive stack to a transmit stack.

In addition to routing the LRO packet 242 to the transmit stack, the packet mapping associated with the LRO packet 242 may be provided to the transmit stack. FIG. 6 is a flowchart illustrating the sharing of the packet mapping between the receive stack and the transmit stack. Initially, the receive stack driver sets up direct memory access (DMA) (Block 270) so that the memory may be accessed independent from a host processor (not shown). The LRO packet 242 is created by the driver (Block 272). The creation of the LRO packet generally includes the steps illustrated in FIG. 4. Specifically, the creation of the LRO packet 242 includes receiving the frames, placing one set of headers in a buffer and aggregating the data from the frames with the headers.

During creation of the LRO packet 242, a packet map is created that maps the data packets of the LRO packet 242 (Block 274). The packet map may include a table for mapping the packets of the LRO packet 242, for example. The packet map is then provided to the transmit driver when the LRO packet 242 is provided to the transmit stack (Block 276). The providing of the packet map may include the providing of the packet map directly to the driver of the transmit stack or providing a memory address of the packet map to the driver. The packet map may then be used by transmit buffer when transmitting packets of the LRO packet 242 (Block 278).

The use of the packet map eliminates the need to remap the data packets. This, thus, reduces processor use and latency, as the maps used in transmitting the packets have already been created when the packets were first received and the LRO packet 242 was created. In addition to providing the packet maps, the MSS is provided to the transmit stack so that it may perform the segmentation in accordance with TSO.

It should be appreciated that the specific embodiments described herein are provided merely as examples and are not intended to be construed as limiting the scope of the disclosure. Indeed, while the examples have been primarily targeted toward a TCP/IP model, the techniques may be implemented in other networking models. As such, all alternative and variant embodiments not explicitly described herein are believed to fall within the scope of the present disclosure.

The invention claimed is:

1. A method of processing data packets comprising:
receiving data packets at a receive stack at an ingress interface of an electronic network device, wherein the receive stack includes a first application layer, a first transport control protocol (TCP) layer, a first Internet protocol (IP) layer, and a first data link layer, the first data link layer having a first bridge layer and a first firmware layer herein;
creating within the first firmware layer a first packet from at least a portion of each of the set of data packets, the first packet including an indicator that the first packet is a large receive offload (LRO) packet;
passing the first packet from the first firmware layer to the first bridge of the receive stack;
upon recognizing the first packet as an LRO packet based on the indicator, overriding a packet size limitation implemented by the first bridge, thereby enabling the first bridge to process the first packet;
determining whether the first packet matches a media access control (MAC) address in a MAC address table provided by the first bridge;
if no match is found in the MAC address table, determining whether the first packet matches an IP address in an IP address table provided by the first IP layer;
if a match is found, transmitting the first packet to a corresponding layer of a transmit stack of an egress interface of the electronic network device without passing the first packet to the first TCP layer or the first application layer of the receive stack, wherein the transmit stack includes a second application layer, a second transport control protocol (TCP) layer, a second Internet protocol (IP) layer, and a second data link layer, the second data link layer having a second bridge layer and a second firmware layer herein, wherein the corresponding layer of the transmit stack that receives the first packet is one of the second bridge layer and the second firmware layer; and
routing, by the transmit stack of the egress interface, the first packet to a destination specified by the match via the egress interface.

2. The method of claim 1 further comprising:
receiving the first packet at the transmit stack; and
providing an indicator that the first packet is a second packet type.

3. The method of claim 1 wherein providing an indicator that first packet is an LRO packet comprises setting one or more bits in a header of the first packet.

4. The method of claim 1 wherein creating the first packet from at least a portion of each of the set of data packets comprises:
creating a first packet header from one of the received packets in a buffer; and
aggregating non-header data from all of the received packets in the buffer with the header.

5. The method of claim 4 further comprising providing the first packet to a driver in the transmit stack, the driver being configured to:
break the first packet into packet segments;
create headers for the packet segments using the first packet header as a template;
generate checksums for the packet segments; and
encapsulate the packet segments, wherein encapsulation comprises:
appending packet segments with created headers; and
providing a frame header and footer.

6. The method of claim 1 further comprising:
determining a size of each of the received packets; and
setting a packet size limit to correspond with the size of the largest received packet, if the largest received packet exceeds a current packet size limit.

7. The method of claim 1 further comprising:
receiving the first packet at the transmit stack;
segmenting the first packet into smaller packets; and
providing the smaller packets to a driver in the transmit stack.

8. The method of claim 1 further comprising:
generating a packet map correlative with the large packet;
providing the packet map to the transmit stack; and
using the packet map to transmit the data of the first packet.

9. An electronic network device comprising:
a processor;
a memory coupled to the processor, the memory storing operating instructions for the operation of the network device;
a transmit stack and a receive stack as part of a network stack provided by an operating system operated by the processor, the transmit stack being associated with an egress interface of the electronic network device and the receive stack being associated with an ingress interface of the electronic network device, each of the transmit stack and receive stack comprising:
a first layer being a data link layer comprising:
a driver; and
a bridge layer logically adjacent to the driver and operated by the processor, the bridge layer including a MAC address table for mapping media control access (MAC) addresses;
a second layer being an Internet protocol (IP) layer logically adjacent to the bridge layer, the second layer including an IP address table for mapping IP addresses;
a transport control protocol (TCP) layer coupled to the IP layer; and
an application layer coupled to the TCP layer,
wherein a driver of the receive stack is configured to create a first packet of a large receive offload (LRO) packet type from a plurality of received data packets, the first packet including an indication for overriding packet size limits;

wherein the bridge layer of the receive stack is configured to:
  recognize the indication for overriding packet size limits;
  overriding a packet size limitation implemented by the bridge layer of the receive stack, thereby enabling the bridge layer of the receive stack to process the first packet;
  determining whether the first packet matches a media access control (MAC) address in the MAC address table of the receive stack; and
  if a match is found, forward the first packet to a bridge layer of the transmit stack upon finding a common address in the MAC address table of the receive stack and a MAC address table of the transmit stack, without forwarding the first packet to the TCP layer or the application layer of the receive stack;
wherein the IP layer of the receive stack is configured to:
  if no match is found in the MAC address table of the receive stack, determine whether the first packet matches an IP address in an IP address table of the receive stack; and
  if a match is found, forward the first packet to an IP layer of the transmit stack upon finding a common address in the IP address table of the receive stack and an IP address table of the transmit stack, without forwarding the first packet to the TCP layer or the application layer of the receive stack.

10. The electronic network device of claim 9 wherein the second layer of the receive stack is configured to recognize the indication for overriding packet size limits and forward the first packet to a second layer of the transmit stack upon finding a common address in the respective second address tables of the receive stack and the transmit stack.

11. The electronic network device of claim 10 wherein the bridge layer and the second layer of the receive stack are configured to indicate the first packet as being a second type upon forwarding the first packet to the transmit stack.

12. The electronic network device of claim 11 wherein the bridge and second layers of the transmit stack are configured to forward the first packet to the driver upon recognizing the first packet as a second type, driver of the transmit stack being configured to segment the first packet in preparation of transmission.

13. The electronic network device of claim 11 wherein the bridge layer and the second layer of the transmit stack are configured to segment the first packet upon recognizing the first packet as a second type.

14. The electronic network device of claim 9 wherein the driver of the transmit stack is configured to communicate segmentation capabilities to the bridge and second layers of the transmit stack.

15. A non-transitory machine-readable medium having instructions stored therein, which when executed by a processor, cause the processor to perform a method for operating an electronic network device, the method comprising:
  receiving data packets at a receive stack at an ingress interface of the electronic network device, wherein the receive stack includes a first application layer, a first transport control protocol (TCP) layer, a first Internet protocol (IP) layer, and a first data link layer, the first data link layer having a first bridge layer and a first firmware layer herein;
  creating within the first firmware layer a first packet from at least a portion of each of the set of data packets, the first packet including an indicator that the first packet is a large receive offload (LRO) packet;
  passing the first packet from the first firmware layer to the first bridge of the receive stack;
  upon recognizing the first packet as an LRO packet based on the indicator, overriding a packet size limitation implemented by the first bridge, thereby enabling the first bridge to process the first packet;
  determining whether the first packet matches a media access control (MAC) address in a MAC address table provided by the first bridge;
  if no match is found in the MAC address table, determining whether the first packet matches an IP address in an IP address table provided by the first IP layer;
  if a match is found, transmitting the first packet to a corresponding layer of a transmit stack of an egress interface of the electronic network device without passing the first packet to the first TCP layer or the first application layer of the receive stack, wherein the transmit stack includes a second application layer, a second transport control protocol (TCP) layer, a second Internet protocol (IP) layer, and a second data link layer, the second data link layer having a second bridge layer and a second firmware layer herein, wherein the corresponding layer of the transmit stack that receives the first packet is one of the second bridge layer and the second firmware layer; and
  routing, by the transmit stack of the egress interface, the first packet to a destination specified by the match via the egress interface.

16. The non-transitory machine-readable medium of claim 15 wherein the method further comprises providing the first packet to the transmit stack via a bridge layer or a IP layer.

17. The non-transitory machine-readable medium of claim 16 wherein the method further comprises converting the first packet to a second packet type.

18. The non-transitory machine-readable medium of claim 16 wherein the method further comprises segmenting the large receive offload packet into smaller packets at driver of the transmit stack.

* * * * *